(12) United States Patent
Nouri et al.

(10) Patent No.: US 12,314,079 B2
(45) Date of Patent: May 27, 2025

(54) SYNTHETIC TIMESTAMP COMPENSATING FOR SKEW BETWEEN SYSTEM CLOCK AND SENSOR CLOCK

(71) Applicant: Hewlett-Packard Development Company, L.P., Spring, TX (US)

(72) Inventors: Joseph Nouri, Fort Collins, CO (US); Kaden Strand, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 100 days.

(21) Appl. No.: 18/555,667

(22) PCT Filed: Apr. 23, 2021

(86) PCT No.: PCT/US2021/028870
§ 371 (c)(1),
(2) Date: Oct. 16, 2023

(87) PCT Pub. No.: WO2022/225531
PCT Pub. Date: Oct. 27, 2022

(65) Prior Publication Data
US 2024/0201733 A1 Jun. 20, 2024

(51) Int. Cl.
*G06F 1/14* (2006.01)
(52) U.S. Cl.
CPC ...................... *G06F 1/14* (2013.01)
(58) Field of Classification Search
CPC ...................... G06F 1/14; G06F 1/10
See application file for complete search history.

(56) References Cited

U.S. PATENT DOCUMENTS

| | | | |
|---|---|---|---|
| 7,020,791 B1* | 3/2006 | Aweya | H03L 7/093 713/400 |
| 8,478,718 B1* | 7/2013 | Ranade | G06F 3/0617 707/625 |
| 9,939,838 B1 | 4/2018 | Gao et al. | |
| 11,935,416 B1* | 3/2024 | Motamedi | G06F 16/909 |
| 12,021,960 B2* | 6/2024 | Sarda | H04L 7/0054 |
| 2014/0068315 A1* | 3/2014 | Aweya | G06F 1/14 713/503 |
| 2014/0143582 A1 | 5/2014 | Kindred et al. | |

(Continued)

OTHER PUBLICATIONS

Chen, et al., "Ultra-low power time synchronization using passive radio receivers", Information Processing in Sensor Networks, Apr. 12, 2011, pp. 235-245.

(Continued)

*Primary Examiner* — Phil K Nguyen
(74) *Attorney, Agent, or Firm* — Quarles & Brady LLP

(57) ABSTRACT

As sensor readings are received from a hardware sensor, each sensor reading is stored within a buffer along with a system timestamp of a system clock indicating when the sensor reading was received. Each sensor reading includes a sensor timestamp of a sensor clock indicating when the sensor reading occurred at the hardware sensor. Responsive to receipt of each sensor reading, a synthetic timestamp compensating for skew between the system clock and the sensor clock is generated and applied to the sensor reading. The synthetic timestamp is generated based on an average skew of the sensor readings within the buffer and an initial system timestamp indicating when a first sensor reading was received.

15 Claims, 5 Drawing Sheets

(56) References Cited

U.S. PATENT DOCUMENTS

| | | | |
|---|---|---|---|
| 2015/0127284 A1 | 5/2015 | Seshan et al. | |
| 2016/0170437 A1* | 6/2016 | Aweya | H04B 10/071 |
| | | | 713/503 |
| 2016/0374043 A1 | 12/2016 | Wetterwald et al. | |
| 2019/0088131 A1* | 3/2019 | Bushnell | G08G 1/161 |
| 2020/0382850 A1* | 12/2020 | Wild | H04Q 9/00 |
| 2023/0221754 A1* | 7/2023 | Sobel | G01S 17/87 |
| 2024/0119629 A1* | 4/2024 | Rasam | G06T 7/50 |
| 2024/0154711 A1* | 5/2024 | Hu | H04N 13/398 |
| 2024/0427372 A1* | 12/2024 | Gillen | G01S 17/931 |

OTHER PUBLICATIONS

Wu, et al., "Reliable clock skew estimation algorithm for one-way measurements", IEEE International Conference on Communications, vol. 4, Jun. 20, 2004, pp. 1846-1850.

\* cited by examiner

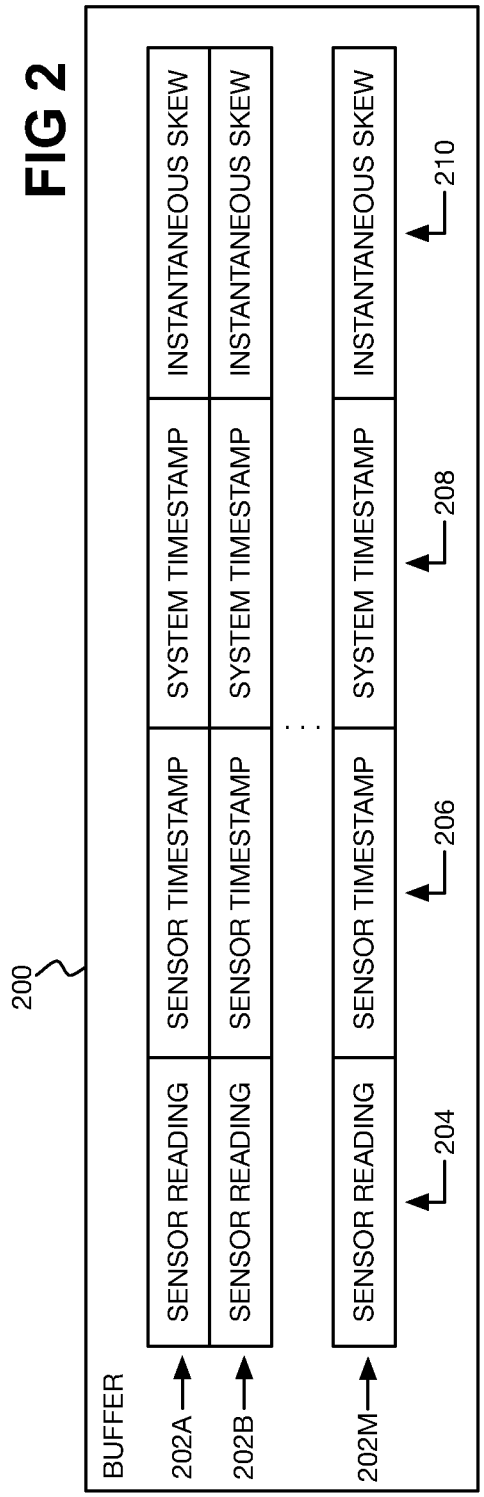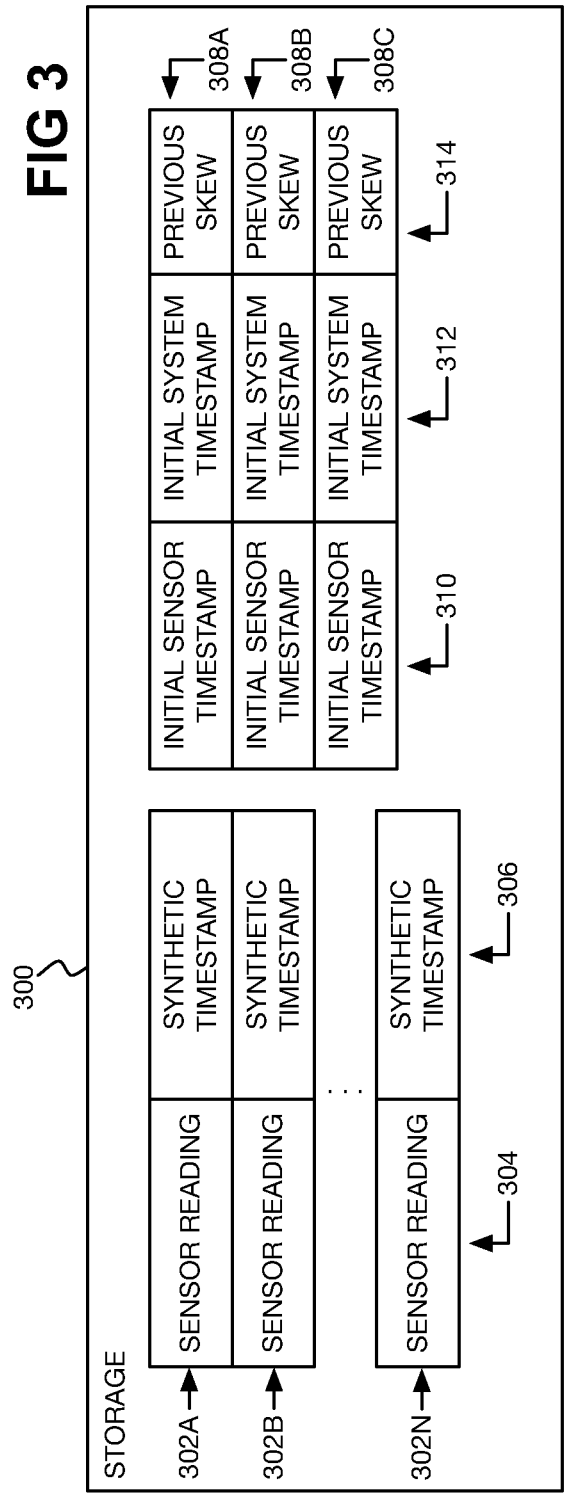

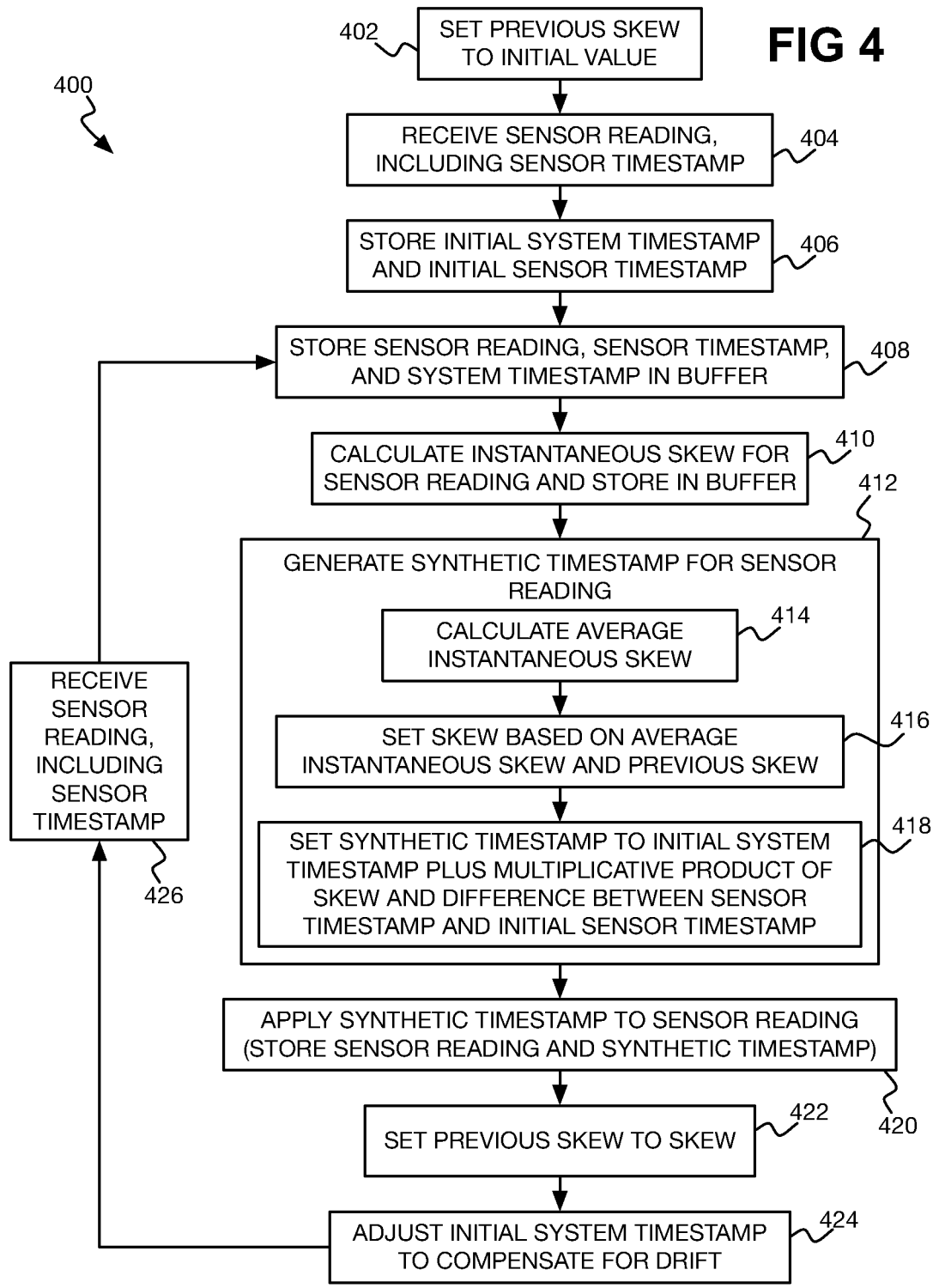

SYNTHETIC TIMESTAMP COMPENSATING FOR SKEW BETWEEN SYSTEM CLOCK AND SENSOR CLOCK

BACKGROUND

A computing device or other system may be communicatively connected to a number of different sensors. The computing device may have its own system clock, and the sensors may have their own sensor clocks or groups of sensors may share respective sensor clocks. The sensors may apply timestamps of their sensor clocks to sensor readings indicating when the sensor readings occurred or were taken, before sending the sensor readings to the computing device. The computing device may in turn apply system timestamps to the sensor readings indicating when the sensor readings were received.

BRIEF DESCRIPTION OF THE DRAWINGS

FIG. 2 is a diagram of an example buffer of the system of FIG. 1.

FIG. 3 is a diagram of an example storage of the system of FIG. 1.

FIG. 4 is a flowchart of an example method for generating and applying a synthetic timestamp compensating for skew between a system clock and a sensor clock.

DETAILED DESCRIPTION

Figure 1:
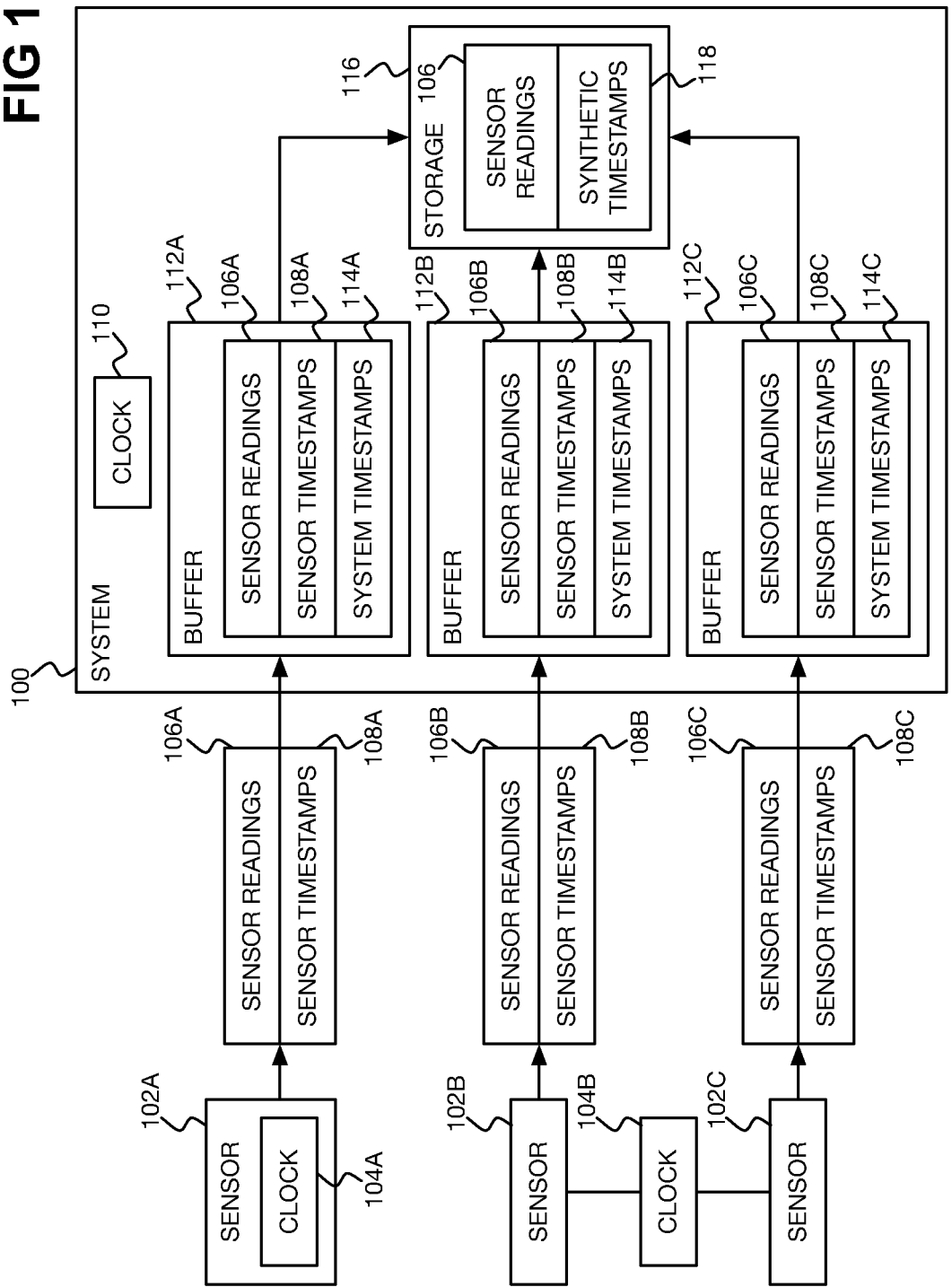
FIG. 1 is a diagram of an example system communicatively connected to a number of example sensors.

As noted in the background, a computing device or other system may have its own system clock, and be communicatively connected to sensors or other devices that have their own sensor (or device) clocks or that share such clocks in groups. The system and sensor clocks may not be synchronized with one another. For example, a timestamp of 4:15:00 PM of one clock may not correspond to the same time as a timestamp of 4:15:00 PM of another clock. Furthermore, the different clocks may track time at different rates. For example, one clock may run fast, gaining a second over a period of time, whereas another clock may run slow, losing a second over the same or different period of time. Therefore, sensor readings by different sensors with different sensor clocks may have different timestamps even though they occur at the same time.

In addition, the computing device or system may not receive sensor readings from different sensors at the same time, even if the sensor readings occurred (i.e., were taken) at the same time. For instance, there may be a different communication latency between each sensor and the computing device. As an example, the computing device may receive a first sensor reading when the system time clock reads 4:15:01 PM and correspondingly apply a system timestamp of 4:15:01 PM to this sensor reading. However, a second sensor reading from a different sensor may have occurred at the same time as the first sensor reading, but the computing device may not receive the second sensor reading until the system clock reads 4:15:03 PM and thus correspondingly apply a system timestamp of 4:15:03 PM to this sensor reading.

Furthermore, unless the computing device or system runs a realtime operating system that guarantees application of system timestamps when sensor readings are actually received, the system timestamps applied to the readings indicating when they were received may be inaccurate. For example, a sensor reading may actually be received at 4:15:05 PM, but may not have a system timestamp applied to it until the system clock reads 4:15:07 PM. In this case, the sensor reading has a system timestamp indicating that the computing device received the reading at 4:15:07 PM, when in actuality the device received the sensor reading two seconds earlier.

Such issues can preclude proper synchronization at the computing device or system among received sensor readings that occurred at different sensors. The computing device cannot utilize the sensor timestamps applied by the sensors to the readings, because the sensor clocks may not be synchronized with one another. That is, the computing device cannot assume that two sensor readings having the same sensor timestamp actually occurred at the same time within a threshold. The computing device also cannot utilize the system timestamps applied to the sensor readings, because of different communication latencies and variable delays in system timestamp application. That is, the computing device cannot assume that two sensor readings having the same system timestamp actually occurred at the same time within a threshold.

Techniques described herein ameliorate these and other issues. The techniques compensate for skew between a system clock and each sensor clock, and as such synchronizes the system clocks and the sensor clocks. Specifically, a synthetic timestamp compensating for such skew is applied to each sensor reading that a computing device or other system receives. Therefore, sensor readings occurring at the same time will have the same synthetic timestamp, within a threshold. The techniques further compensate for drift between the synthetic timestamp and the initial system timestamp, which otherwise can increase over time.

FIG. 1 shows an example system 100. The system 100 may be in the form of a computing device, such as a desktop, laptop, or notebook computer, or a smartphone, tablet computing device, or other type of computing device. The system 100 is communicatively connected to sensors 102A, 102B, and 102C, which are collectively referred as the sensors 102. In the example, there are three sensors 102, but there may be more or fewer than three sensors 102. The sensors 102 may each be communicatively connected to the system 100 in a wireless or a wired manner. As one example, each sensor 102 may be connected to the system 100 via a universal serial bus (USB) connection.

The sensors 102 may be of different types. For example, the sensors can include audio-capturing and image-capturing sensors. In the context of extended reality (XR) technologies, such as virtual reality (VR), augmented reality (AR), and mixed reality (MR) technologies, such image-capturing sensors in particular can include eye-tracking sensors. The sensors may include other types of sensors as well, such as physiological sensors. In the context of XR technologies, such physiological sensors may include photoplethysmogram (PPG), or pulse-tracking, sensors, as well as electromyography (EMG), or muscle-response, sensors.

In the example of FIG. 1, the sensor 102A has its own sensor clock 104A, whereas the sensors 102B and 102C share the same sensor clock 104B. The sensor clocks 104A and 104B are collectively referred to as the sensor clocks 104. In other implementations, each sensor 102 may have its own sensor clock 104, and/or different groups of sensors 102 may each share the same respective sensor clock 104. The sensor clocks 104 may not be synchronized with one another. That is, the sensor clock 104A reading a time of 4:15:00 PM may not correspond to the same time as when the sensor clock 104B reads a time of 4:15:00 PM.

As the sensor 102A generates sensor readings 106A, the sensor 102A applies sensor timestamps 108A of the sensor clock 104A that indicate when the readings 106A occurred, and sends the sensor readings 106A with the timestamps 108A to the system 100. Similarly, as the sensor 102B generates sensor readings 106B, the sensor 102B applies sensor timestamps 108B of the sensor clock 104B indicating when the readings 106B occurred, and sends them to the system 100. As the sensor 102C generates sensor readings 106C, the sensor 102C applies sensor timestamps 108C of the sensor clock 104B indicating when the readings 106C occurred, and sends them to the system 100. The sensor readings 106A, 106B, and 106C are collectively referred to as the sensor readings 106, and the sensor timestamps 108A, 108B, and 108C are collectively referred to as the sensor timestamps 108.

The system 100 includes a system clock 110, which may not be synchronized with any sensor clock 104. The system 100 includes buffers 112A, 112B, and 112C respectively corresponding to the sensors 102A, 102B, and 102C, and collectively referred to as the buffers 112. That is, there is a buffer 112 for each sensor 102 from which the system 100 receives and stores sensor readings 106 and sensor timestamps 108. The buffers 112 may be volatile semiconductor memory, for instance. However, in another implementation, the buffers 112 may be implemented using non-volatile storage, such as a hard disk drive, a solid state drive, and so.

As the system 100 receives the sensor readings 106A and the sensor timestamps 108A, the system 100 applies respective system timestamps 114A of the system clock 110 to the readings 106A, and stores the readings 106A, their sensor timestamps 108A, and the applied system timestamps 114A in the buffer 112A. The system timestamps 114A at least nominally indicate when the system 100 received the sensor readings 106A from the sensor 102A. In the case in which the system 100 is running an operating system, such as versions of the MICROSOFT WINDOWS operating system and most versions of the LINUX operating system, which is not a realtime operating system, the system timestamps 114A may be inaccurate in their indications as to when the sensor readings 106A were received.

Similarly, as the system 100 receives the sensor readings 106B and the sensor timestamps 108B, the system 100 applies respective system timestamps 114B of the system clock 110 to the readings 106B, and stores the readings 106B, their sensor timestamps 108B, and the applied system timestamps 114B in the buffer 112B. As the system 100 receives the sensor readings 106C and the sensor timestamps 108C, the system 100 applies respective system timestamps 114C of the system clock 110 to the readings 106C, and stores the readings 106C, their sensor timestamps 108C, and the applied system timestamps 114C in the buffer 112C. The system timestamps 114A, 114B, and 114C are collectively referred to as the system timestamps 114, and as noted at least nominally indicate when the system 100 receive the corresponding sensor readings 106 from the sensors 102.

The system 100 also includes a storage 116, which may be a non-volatile storage device such as a hard disk drive, solid state drive, and so on. In the example the buffers 112 are depicted as separate from the storage 116, but may instead be part of the storage 116. As the system 100 receives and stores the sensor readings 106 and the sensor timestamps 108 in the buffers 112 along with the system timestamps 114, the system 100 generates and applies synthetic timestamps 118 to the sensor readings 106, and stores them in the storage 116. The synthetic timestamps 118 compensate for skew between and among the system clock 110 and the sensor clocks 104. Therefore, a sensor reading 106 having a synthetic timestamp 118 earlier in time than a synthetic timestamp 118 of another sensor reading 106 is guaranteed to have occurred before the latter reading 106, within a threshold.

FIG. 2 shows an example buffer 200 in detail, which can implement each buffer 112 of FIG. 1. The buffer 200 corresponds to (i.e., is for) a particular sensor, and includes a number of entries 202A, 202B, and 202M, which are collectively referred to as the buffer entries 202. There may be 512 such entries 202, for example. The buffer 200 can be a first-in, first-out (FIFO), buffer, such as a ring buffer. Therefore, once all the entries 202 have been filled, the oldest entry 202 is overwritten with a new entry 202. For sensors that generate sensor readings many times a second, the buffer entries 202 may thus be overwritten one or multiple times each second.

Each buffer entry 202 includes a sensor reading 204, a sensor timestamp 206, a system timestamp 208, and an instantaneous skew 210. When a sensor reading 204, along with its sensor timestamp 206 indicating when the sensor reading 204 occurred, is received from a sensor, the sensor reading 204 is thus stored in an empty or oldest buffer entry 202. A system timestamp 208 indicating when the sensor reading 204 was received is also stored in this buffer entry 202. In one implementation, an instantaneous skew 210 of the sensor reading 204 is also calculated and stored in the buffer entry 202 in question.

The instantaneous skew 210 of a sensor reading 204 is calculated based on the sensor and system timestamps 206 and 208 of the sensor reading 204 and the prior sensor reading 204. Specifically, the instantaneous skew 210 of the sensor reading 204 may be calculated as the difference between the system timestamps 208 of the sensor reading 204 and the prior sensor reading 204, divided by the difference between the sensor timestamps 206 of the sensor reading 204 and the prior sensor reading 204. In the case of the first sensor reading 204 received from the sensor in question, the instantaneous skew 210 may be set one, corresponding to no skew, however.

FIG. 3 shows an example storage 300 in detail, which can implement the storage 116 of FIG. 1. The storage 300 includes a number of entries 302A, 302B, . . . , 302N, which are collectively referred to as the sensor reading entries 302. There may be many more sensor reading entries 302 than buffer entries 202, and whereas the number of buffer entries 202 is limited to a specified number in advance, the number of entries 302 is effectively limitless so long as the storage 300 has sufficient capacity. In actuality, as the sensor reading entries 302 age, they may be periodically (e.g., daily, monthly, yearly, and so on) be discarded, or moved to a different storage.

Each sensor reading entry 302 includes a sensor reading 304 and a corresponding synthetic timestamp 306. As the sensor readings 204 are stored in the buffer 200, along with their sensor timestamps 206, system timestamps 208, and instantaneous skews 210, the sensor readings 204 are read from the buffer 200 of FIG. 2. A synthetic timestamp 306 is generated for and applied to each sensor reading 204, and a sensor reading entry 302 is added for storage of the sensor reading 204 (as a sensor reading 304) and its respectively applied synthetic timestamp 306.

The storage 300 also includes sensor entries 308A, 308B, and 308C that each correspond to a different sensor, and which are collectively referred to as the sensor entries 308. In the example there are three entries 308, in correspondence with the three sensors 102 of FIG. 1. Furthermore, in the example the entries 308 are stored in the same storage 300 as the storage entries 302. However, in another implementation, the entries 308 may be stored in a different storage than the storage entries 302, such as a volatile storage like volatile semiconductor memory.

Each sensor entry 308 includes an initial sensor timestamp 310 and an initial system timestamp 312, and may also include a previous skew 314. The initial sensor timestamp 310 is the sensor timestamp 310 of the first, or initial, sensor reading 304 received from the sensor to which the sensor entry 308 corresponds. The initial system timestamp 312 is likewise the system timestamp 310 applied to the first, or initial, sensor reading 304 received from the sensor in question. The initial system timestamp 312 may be adjusted to compensate for drift between each synthetic timestamp 306 as it is generated and the initial system timestamp 312. The previous skew 314 is the skew calculated for the most recently received sensor reading 304 from the sensor to which the sensor entry 308 corresponds, and can be used to calculate the skew for the next sensor reading 304 that is received from this sensor.

FIG. 4 shows an example method 400 for generating and applying a synthetic timestamp compensating for skew between a system clock and a sensor clock of a sensor. The method 400 is performed on a per-sensor basis. That is, the method 400 is independently performed for each sensor to which a system, such as the system 100 of FIG. 1, is communicatively connected. Stated another way, the method 400 is separately repeated for each such sensor. The method 400 may be implemented as program code stored on a non-transitory computer-readable data storage medium, and executed by a processor of the system, which may be a computing device.

The method 400 includes setting the previous skew for the sensor to an initial value corresponding to synchronization between the system clock and the sensor clock (402), such as one. Upon receiving a sensor reading, including a sensor timestamp, from the sensor (404) for the first time, the method 400 includes storing this sensor timestamp, along with the system timestamp of the system clock indicating when the sensor reading was received (406). This sensor timestamp and system timestamp are the initial sensor timestamp and the initial system timestamp, respectively, for the sensor.

The method 400 includes storing the sensor reading, the sensor timestamp, and the system timestamp in a buffer for the sensor (408), and calculating the instantaneous skew for the sensor reading and storing it in the buffer as well (410). The method 400 includes then generating a synthetic timestamp for the sensor reading (412). For instance, the average instantaneous skew for all the sensor readings currently stored in the buffer may be calculated (414). The skew for the sensor reading may then be set based at least on the average instantaneous skew for the sensor reading, and may also be set based on the previous skew (416).

For instance, the skew for the sensor reading may most simply be set to the average instantaneous skew for the sensor reading. The skew may instead be heuristically set, based on the average instantaneous skew and the previous skew. As one example, the skew may be calculated as a linear interpolation from the previous skew to the instantaneous skew using a constant parameter, such as $10^{-7}$. The synthetic timestamp for the sensor reading may then be set to the initial system timestamp, plus the multiplicative product of the skew and the difference between the sensor timestamp of the sensor reading and the initial sensor timestamp (418).

The method 400 includes applying the generated synthetic timestamp to the sensor reading (420). For example, the sensor reading along with the synthetic timestamp may be stored in a storage. The method 400 includes then setting the previous skew to the skew that has just been calculated (422), which can be used to set the skew when the next sensor reading is received from the sensor. The method 400 can include adjusting the initial system timestamp to compensate for drift between the synthetic timestamp that has been generated and the initial system timestamp (424). Upon receiving another sensor reading, including a sensor timestamp, from the sensor (426), the method 400 is repeated at part 408.

Figure 5:
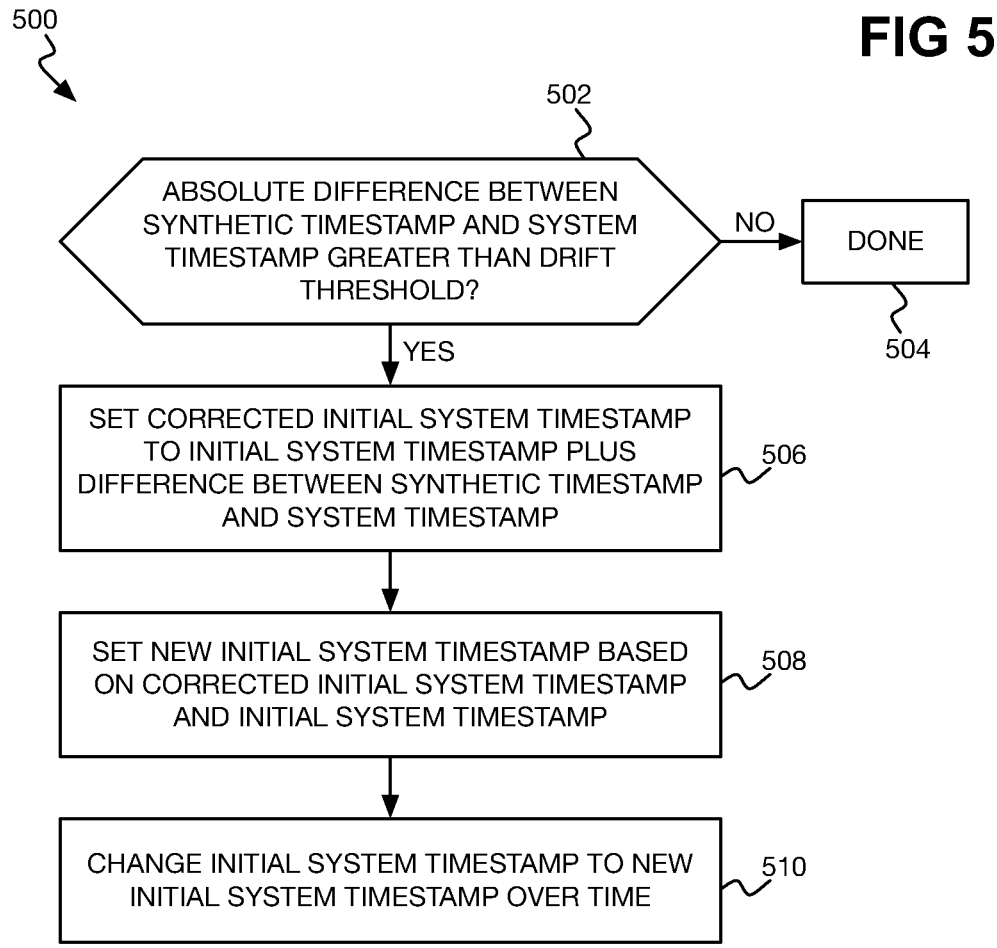
FIG. 5 is a flowchart of an example method for adjusting an initial system timestamp to compensate for drift between a synthetic timestamp and the initial system timestamp.

FIG. 5 shows an example method 500 for compensating for drift between a generated synthetic timestamp and an initial system timestamp. The method 500 may be performed as part 422 of the method 400 of FIG. 4, for instance. As with the method 400, the method 500 may be implemented as program code stored on a non-transitory computer-readable data storage medium, and executed by a processor of the system that performs the method 400, such as a computing device. Because the method 400 is implemented on a per-sensor basis and the method 500 can be performed as part 422 of this method 400, the method 500 is in effect also independently performed separately for each sensor.

Without adjustment of the initial system timestamp, as synthetic timestamps are generated, the drift between the most recently generated timestamp and the initial system timestamp will increase over time, resulting in synthetic timestamps that have no correlation to the actual system clock. That is, while the synthetic timestamps for all sensors will be correctly temporally ordered in relation to one another (within a threshold), over time they will have little bearing to the actual time (per the system clock) when their corresponding sensor readings occurred. Therefore, the method 500 compensates for such drift between the synthetic timestamp and the initial system timestamp, by adjusting the initial system timestamp.

If the absolute difference between the synthetic timestamp applied to a sensor reading received from a sensor and the system timestamp applied to this reading is not greater than a drift threshold (502), then the method 500 is finished (504), such that no adjustment of the initial system timestamp for the sensor is made to compensate for drift. In one implementation, however, the threshold may be set to zero. This in effect means that initial system timestamp adjustment will likely occur each time a synthetic timestamp is generated, since the likelihood that a synthetic timestamp generated for a sensor reading will be identical to the system timestamp applied to the sensor reading is exceedingly low.

By comparison, if the synthetic timestamp deviates from the system timestamp by more than the drift threshold (502), then the method 500 includes setting a corrected initial system timestamp for the sensor in question to the initial system timestamp for the sensor plus a difference between the synthetic timestamp generated for the sensor reading and the system timestamp applied to this reading (506). The method 500 includes setting a new initial system timestamp for the sensor based at least on the corrected initial system timestamp, and may also be set based on the initial system timestamp (508). For instance, the new initial system timestamp may most simply be set to the corrected initial system timestamp.

The new initial system timestamp may instead be heuristically set based on the corrected initial system timestamp and the initial system timestamp. As one example, the new initial system timestamp may be calculated as a linear interpolation from the initial system timestamp to the corrected initial system timestamp using a constant parameter, such as 0.005. The method 500 includes then changing the initial system timestamp for the sensor to the new initial system timestamp (510), such as over time. For example, the initial system timestamp may be linearly adjusted so that it equals the new initial system timestamp within one second.

Figure 6:
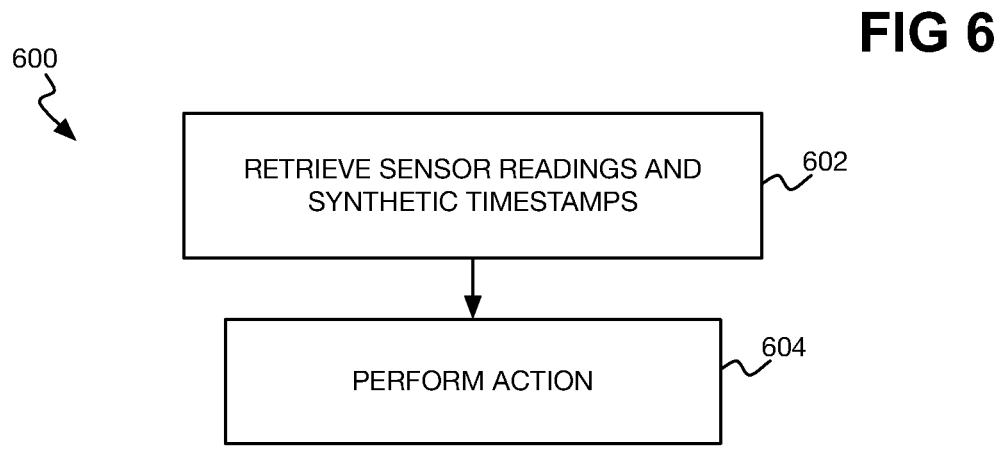
FIG. 6 is a flowchart of an example method for using sensor readings to which synthetic timestamps have been applied.

FIG. 6 shows an example method 600 for using sensor readings received from one or multiple sensors and to which synthetic timestamps have been applied. The method 600 can be performed by the same system that performs the methods 400 and 500 of FIGS. 4 and 5. The method 600 may likewise be implemented as program code stored on a non-transitory computer-readable data storage medium and executable by a processor of the system, which may be a computing device.

Once the synthetic timestamps have been generated and applied to respective sensor readings, the sensor readings are properly temporally ordered in relation to one another, within a threshold. Therefore, sensor readings having the same synthetic timestamps are guaranteed to have occurred at the same time, within the threshold. A sensor reading having a synthetic timestamp corresponding to an earlier or later time than a synthetic timestamp of another sensor reading is likewise guaranteed to have respectively occurred before or after the latter reading, within the threshold.

As to the techniques that have been described for generating synthetic timestamps, the threshold in correctness or accuracy of the synthetic timestamps has been demonstrated to be within a few milliseconds. The techniques can therefore more accurately synchronize sensor and system clocks than other synchronization techniques. For example, synchronization techniques relying on the Network Time Protocol (NTP) are generally accurate within hundreds of milliseconds, and thus are two orders of magnitude less accurate than the techniques described above. The described techniques therefore permit usage in scenarios in which greater synchronization accuracy is needed.

The method 600 includes retrieving the sensor readings and their synthetic timestamps (602), such as from a storage to which the readings have been stored after generation and application of the synthetic timestamps to the sensor readings. The method 600 includes then performing an action based on the sensor readings and the synthetic timestamps (604). The correctness of the action is improved due to the compensation of skew between the system clock and the sensor clock(s) as effectively encoded within the synthetic timestamps.

For example, in the context of XR technologies, sensor readings occurring at about the same time (e.g., within the span of a few milliseconds) may be used as a basis upon which to make an inference regarding a user. One type of biometric inference processing, for instance, is the estimation or gauging of cognitive load, which may be non-restrictively defined as a multidimensional construct representing the load that performing a particular task imposes on a user's cognitive system. To correctly perform such biometric inference processing, the sensor readings have to be correctly temporally ordered, as is the case with their applied synthetic timestamps.

On the basis of the biometric inference, the information that the system shows the user on a display device may be adjusted. For example, if the cognitive load of the user is low, then the system may display more information to the user at a given time, or may hasten the pace at which the user is requested to perform a given task. Similarly, if the cognitive load of the user is high, then the system may display less information to the user so as to not overwhelm him or her, or slow the pace at which the user is requested to perform the given task.

In this case, then, the making of the biometric inference from the sensor readings (as correctly temporally ordered per their synthetic timestamps), and the resulting adjustment in the information displayed to the system, constitute the action that is performed. That is, the operation of the system is adjusted or modified based on the sensor readings and their applied synthetic timestamps. If the action were instead performed on the basis of the system timestamps applied to the sensor readings or their sensor timestamps, the biometric inference and the subsequent operational adjustment would more likely be incorrect, because the temporal ordering of sensor readings from different sensors (as well as from the same sensor) would more likely be inaccurate.

Figure 7:
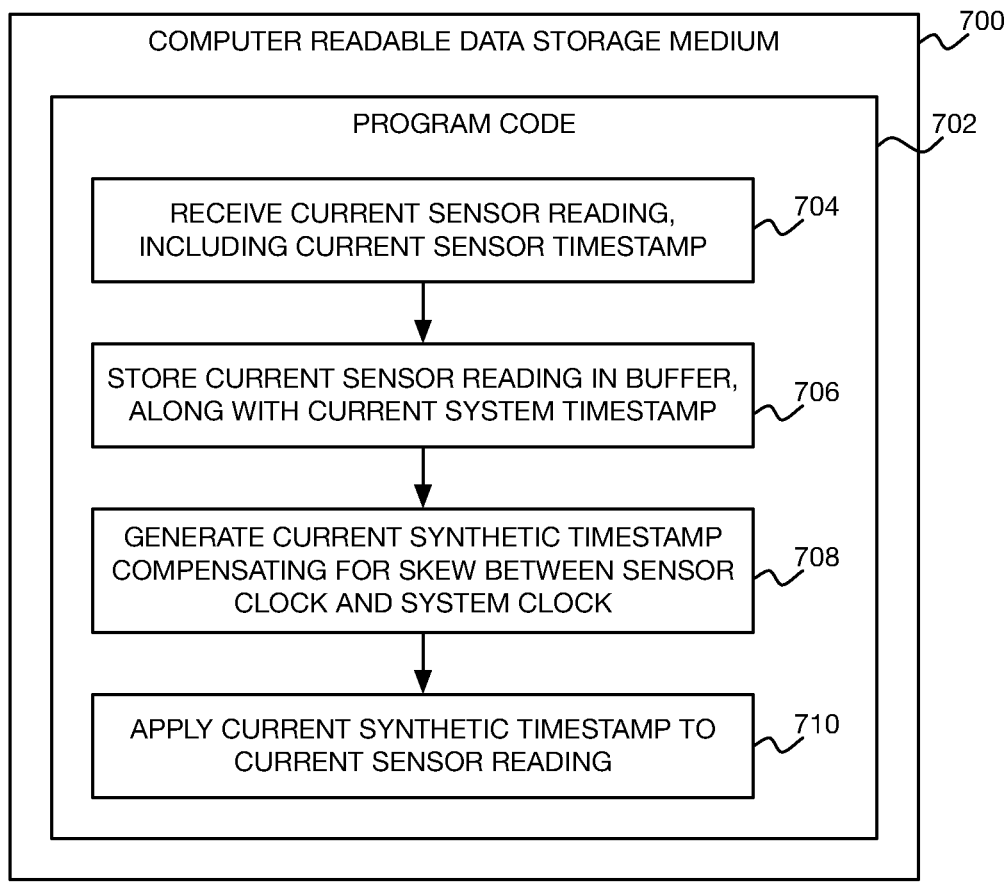
FIG. 7 is a diagram of an example non-transitory computer-readable data storage medium.

FIG. 7 shows an example computer-readable data storage medium 700 storing program code 702 that is executable by a processor to perform processing. The processing includes receiving a current sensor reading from a hardware sensor (704). The current sensor reading including a current sensor timestamp of a sensor clock indicating when the current sensor reading occurred at the hardware sensor. The processing includes storing the current sensor reading in a buffer of sensor readings along with a current system timestamp of a system clock indicating when the current sensor reading was received (706). The processing includes generating a current synthetic timestamp for the current sensor reading compensating for skew between the system clock and the sensor clock (708), based on an average instantaneous skew of the sensor readings within the buffer and an initial system timestamp indicating when a first sensor reading was received. The processing includes then applying the current synthetic timestamp to the current sensor reading (710).

Figure 8:
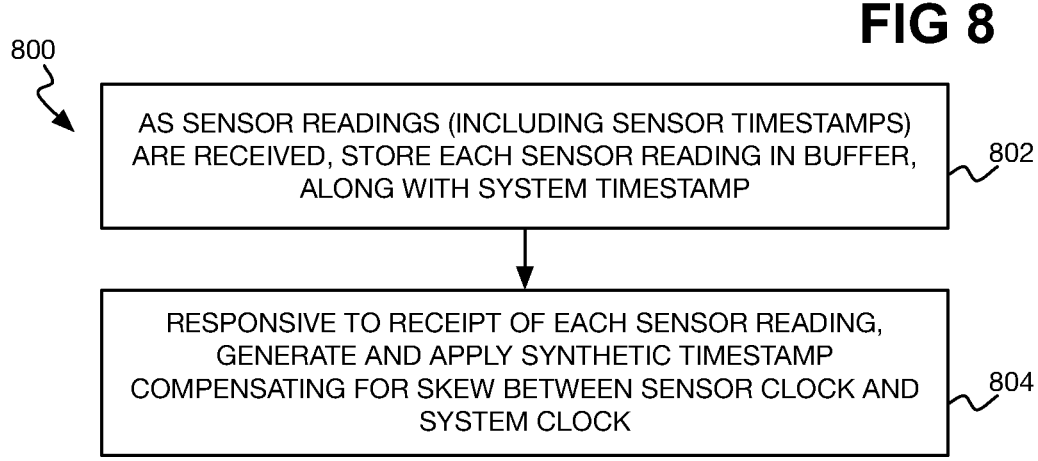
FIG. 8 is a flowchart of an example method.

FIG. 8 shows an example method 800. The method 800 may be performed by a system such as a computing device. The method 800 includes, as sensor readings are received from a hardware sensor, storing each sensor reading within a buffer along with a system timestamp of a system clock indicating when the sensor reading was received (802). Each sensor reading includes a sensor timestamp of a sensor clock indicating when the sensor reading occurred at the hardware sensor. The method 800 includes, responsive to receipt of each sensor reading, generating a synthetic timestamp compensating for skew between the system clock and the sensor clock, and applying the synthetic timestamp to the sensor reading (804). The synthetic timestamp is generated based on an average skew of the sensor readings within the buffer and an initial system timestamp indicating when a first sensor reading was received.

Techniques have been described for compensating for skew between a system clock and a sensor clock, as well as for compensating for drift between a generated synthetic timestamp and an initial system timestamp indicating when a sensor reading was first received from a sensor. By generating and applying synthetic timestamps as sensor readings are received, the sensor readings are correctly temporally ordered within a threshold, such as a few milliseconds. Actions can therefore be more correctly performed on the basis of the sensor readings to which the synthetic timestamps have been applied. The techniques can be employed in conjunction with XR technologies employing sensors, as well as other scenarios.

We claim:

1. A non-transitory computer-readable data storage medium storing program code executable by a processor to perform processing comprising:
    receiving a current sensor reading from a hardware sensor, the current sensor reading including a current sensor timestamp of a sensor clock indicating when the current sensor reading occurred at the hardware sensor;
    storing the current sensor reading in a buffer of sensor readings along with a current system timestamp of a system clock indicating when the current sensor reading was received;
    generating a current synthetic timestamp for the current sensor reading compensating for skew between the system clock and the sensor clock, based on an average instantaneous skew of the sensor readings within the buffer and an initial system timestamp indicating when a first sensor reading was received; and
    applying the current synthetic timestamp to the current sensor reading.

2. The non-transitory computer-readable data storage medium of claim 1, wherein the processing further comprises:
    performing an action based on the sensor readings,
    wherein a correctness of the action is improved due to compensation of the skew between the system clock and the sensor clock.

3. The non-transitory computer-readable data storage medium of claim 1, wherein the current sensor reading has a current instantaneous skew equal to a difference between the current system timestamp and a previous system timestamp of the system clock indicating when a previous sensor reading was received, divided by a difference between the current sensor timestamp and a previous sensor timestamp of the sensor clock indicating when the previous sensor reading occurred.

4. The non-transitory computer-readable data storage medium of claim 3, wherein generating the current synthetic timestamp comprises:
    heuristically setting a current skew based on the average instantaneous skew and a previous skew; and
    setting the current synthetic timestamp to the initial system timestamp plus a multiplicative product of the current skew and a difference between the current sensor timestamp and an initial sensor timestamp indicating when the first sensor reading occurred.

5. The non-transitory computer-readable data storage medium of claim 4, wherein the processing further comprises, responsive to the current synthetic timestamp deviating from the current system timestamp by more than a drift threshold:
    setting a corrected initial system timestamp to the initial system timestamp plus a difference between the current synthetic timestamp and the current system timestamp; and
    heuristically setting a new initial system timestamp based on the corrected initial system timestamp and the current system timestamp, the new initial system timestamp compensating for synthetic timestamp drift from the initial system timestamp.

6. A method comprising:
    as sensor readings are received from a hardware sensor, storing each sensor reading within a buffer along with a system timestamp of a system clock indicating when the sensor reading was received,
        wherein each sensor reading includes a sensor timestamp of a sensor clock indicating when the sensor reading occurred at the hardware sensor; and
    responsive to receipt of each sensor reading, generating a synthetic timestamp compensating for skew between the system clock and the sensor clock, and applying the synthetic timestamp to the sensor reading,
        wherein the synthetic timestamp is generated based on an average skew of the sensor readings within the buffer and an initial system timestamp indicating when a first sensor reading was received.

7. The method of claim 6, further comprising:
    repeating the method for each of one or multiple other hardware sensors.

8. The method of claim 7, further comprising:
    performing an action based on the sensor readings,
    wherein a correctness of the action is improved due to compensation of the skew between the system clock and the sensor clock.

9. The method of claim 6, wherein each sensor reading has a skew equal to a difference between the system timestamp of the sensor reading and the system timestamp of a previous sensor reading, divided by a difference between the sensor timestamp of the sensor reading and the sensor timestamp of the previous sensor reading.

10. The method of claim 6, wherein generating the synthetic timestamp comprises:
    setting a current skew based on the average skew; and
    setting the synthetic timestamp to the initial system timestamp plus a multiplicative product of the current skew and a difference between the sensor timestamp and an initial sensor timestamp indicating when the first sensor reading occurred.

11. The method of claim 10, wherein setting the current skew comprises:
    heuristically setting the current skew based on the average skew and a previous skew.

12. The method of claim 6, further comprising:
    adjusting the initial system timestamp indicating when the first sensor reading was received to compensate for drift between the synthetic timestamp and the initial system timestamp.

13. The method of claim 12, wherein the initial system timestamp is adjusted responsive to the synthetic timestamp deviating from the system timestamp by more than a drift threshold.

14. The method of claim 12, wherein adjusting the initial system timestamp comprises:
    setting a corrected initial system timestamp to the initial system timestamp plus a difference between the synthetic timestamp and the system timestamp; and
    setting a new initial system timestamp based on the corrected initial system timestamp.

15. The method of claim 14, wherein setting the new initial system timestamp based on the corrected initial system timestamp comprises:
    heuristically setting the new initial system timestamp based on the corrected initial system timestamp and the system timestamp.

* * * * *